United States Patent [19]

Lohbauer et al.

[11] Patent Number: 4,481,770
[45] Date of Patent: Nov. 13, 1984

[54] FLUID SYSTEM WITH FLOW COMPENSATED TORQUE CONTROL

[75] Inventors: Kenneth R. Lohbauer; Paul C. Moots, both of Joliet, Ill.

[73] Assignee: Caterpillar Tractor Co., Peoria, Ill.

[21] Appl. No.: 360,854

[22] Filed: Mar. 22, 1982

[51] Int. Cl.³ .................... F16D 31/02; F15B 11/02
[52] U.S. Cl. ........................... 60/452; 60/445; 60/468; 60/489; 91/516
[58] Field of Search ............... 60/450, 451, 452, 445, 60/443, 444, 422, 487, 489, 468; 91/516

[56] References Cited

U.S. PATENT DOCUMENTS

| | | | |
|---|---|---|---|
| 3,077,898 | 2/1963 | Raymond | 137/491 |
| 3,212,523 | 10/1965 | Martin | 137/596.13 |
| 3,333,415 | 8/1967 | Adams | 60/450 |
| 3,478,513 | 11/1969 | Ma et al. | 60/451 |
| 3,543,508 | 12/1970 | Schwab | 60/445 |
| 3,818,802 | 6/1974 | Wilson | 91/443 |
| 3,878,679 | 4/1975 | Sievenpiper | 60/450 |
| 3,910,045 | 10/1975 | Herrmann | 60/433 |
| 4,011,721 | 3/1977 | Yip | 60/450 |
| 4,034,563 | 7/1977 | Orth | 60/422 |
| 4,041,983 | 8/1977 | Bianchetta | 137/625.63 |
| 4,079,805 | 3/1978 | Rau | 60/450 |
| 4,132,506 | 1/1979 | Dantlgraber | 60/452 |
| 4,206,688 | 6/1980 | Haak et al. | 137/579.2 |
| 4,253,540 | 3/1981 | Berg | 60/450 |
| 4,286,502 | 9/1981 | Bianchetta et al. | 91/461 |
| 4,343,151 | 8/1982 | Lorimor | 91/516 |
| 4,383,412 | 5/1983 | Presley | 60/452 |

Primary Examiner—Robert E. Garrett
Assistant Examiner—H. Edward Li
Attorney, Agent, or Firm—J. W. Burrows

[57] ABSTRACT

A fluid control system (10) for controlling the torque of a fluid motor (22) and varying the flow to the fluid motor (22) has a mechanism (56) to control the torque and flow in proportion to the operator's input to a pilot operated control valve (16) that controls the fluid motor (22). The mechanism (56) controls the torque and flow of the fluid motor (22) during both acceleration and deceleration of the fluid motor (22). The fluid control system eliminates the need for special, complicated control valves.

20 Claims, 1 Drawing Figure

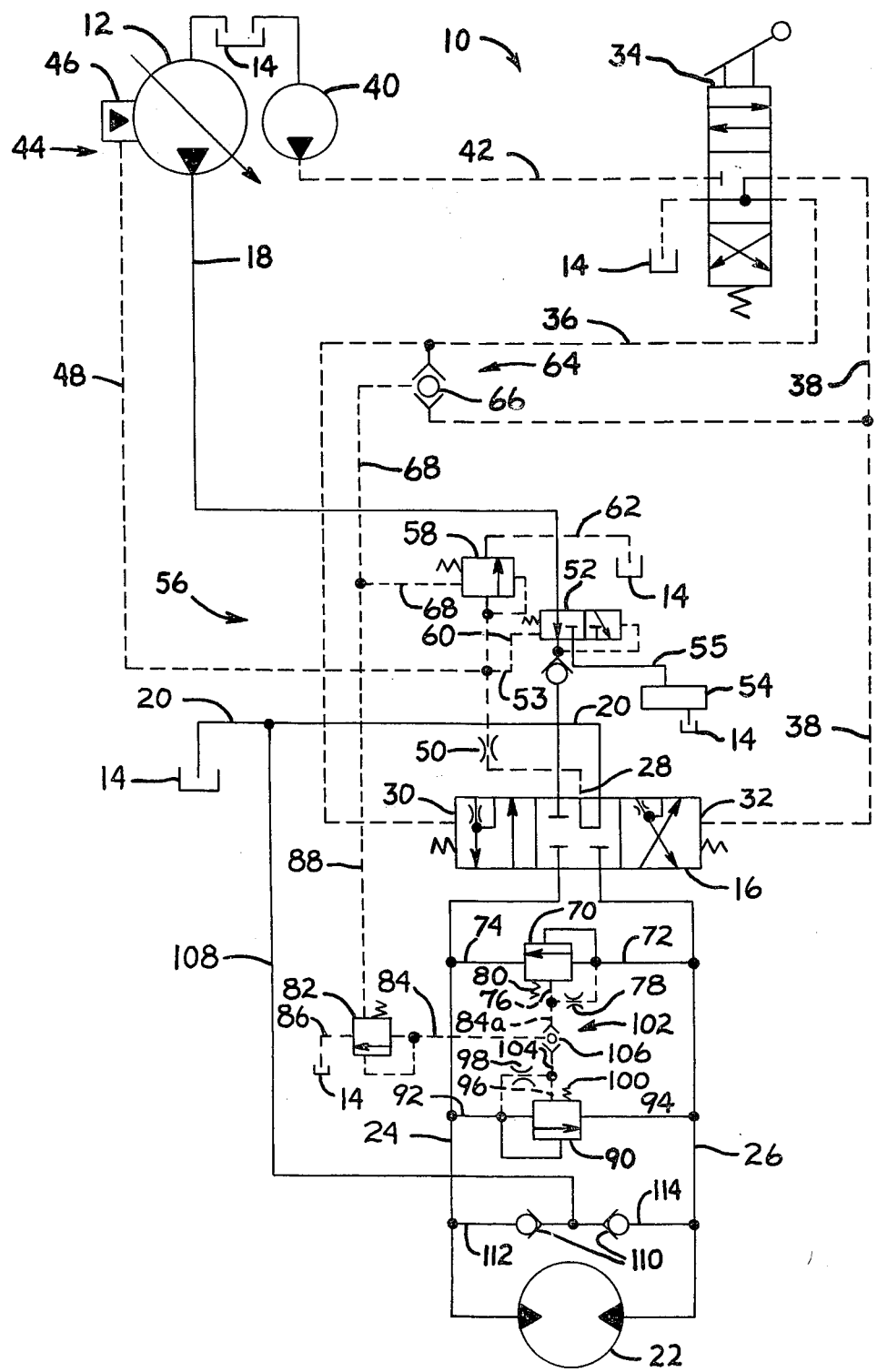

FLUID SYSTEM WITH FLOW COMPENSATED TORQUE CONTROL

TECHNICAL FIELD

This invention is directed to a fluid control system and more particularly to a mechanism for varying the output flow and pressure from a pump to a fluid motor and for controlling the torque of the fluid motor in proportion to the pressure required to actuate the control valve in the system.

BACKGROUND ART

In some fluid systems today, torque developed by a fluid motor is controlled strictly by a control valve. In these systems, the control valves are pilot operated and have feedback passages sensing the pressure in the fluid lines between the motor and the control valve. The feedback passages are communicated to small pistons in the control valve for counteracting the force of the pilot fluid to move the spool in the control valve to a position for passing only the fluid required to maintain a desired output torque by the fluid motor. The remainder of the fluid is returned to tank at high pressure over a relief valve or through an exhaust port in the control valve.

Other systems use a pump control that provides a control over the displacement of the flow from the pump in response to the load signal or system requirements reaching a predetermined pressure level.

One of the problems encountered with such systems is the need to have an elaborate control valve with several extra components. Some of these systems also do not allow the operator to control the amount of torque applied by the motor during acceleration or deceleration.

The present invention is directed to overcoming one or more of the problems as set forth above.

DISCLOSURE OF THE INVENTION

In one aspect of the invention, a fluid control system has a pump connected to a tank, a fluid motor and a pilot operated control valve in fluid communication with the pump and the fluid motor. The pilot operated control valve has a neutral, an operative position and a load sensing port. The system includes a first means for varying the output flow and pressure from the pump to the fluid motor in response to a load signal received through the load sensing port with the control valve in the operative position. A pilot valve is in fluid communication with a source of pressurized pilot fluid and is adapted to controllably communicate the pressurized pilot fluid to an end of the control valve for moving the control valve between the neutral position and the operative position. A second means is provided for varying the output flow and pressure from the pump to the fluid motor and for controlling the torque developed by the fluid motor in proportion to the controlled pressurized pilot fluid communicated to the end of the control valve.

The problem of needing a special, elaborate valve is solved by the use of this invention which requires only a standard control valve having a load sensing port. The problem of having no direct control over the amount of torque applied by the fluid motor is overcome with the use of the mechanism of the second means which responds in proportion to the controlled pressurized pilot fluid communicated to the end of the control valve. The components of the present invention are readily available thus no special components are needed.

BRIEF DESCRIPTION OF THE DRAWING

The sole FIGURE is a schematic of an embodiment of the present invention.

BEST MODE FOR CARRYING OUT THE INVENTION

Referring now to the drawing, a fluid system is generally indicated by reference numeral 10. The fluid system 10 includes a variable displacement pump 12 connected to a tank or reservoir 14 and a pilot operated control valve 16 connected to the output of the pump 12 through a pressure conduit 18 and to the tank 14 through a drain conduit 20. A fluid motor 22 is connected to the control valve 16 through motor conduits 24, 26 respectively.

The control valve 16 has a load sensing port 28, first and second ends 30, 32 and is movable between a spring biased neutral position and first and second operative positions. A pilot valve 34 is connected to the first and second ends 30, 32 respectively by pilot conduits 36, 38 and to a source of pressurized pilot fluid, such as a pilot pump 40, by a conduit 42.

A first means 44, such as a pump control 46, is connected to the load sensing port 28 of the control valve 16 by a load signal conduit 48. An orifice 50 is located in the load signal conduit 48.

A flow control valve, such as a priority flow control valve 52 is located in the pressure conduit 18. A conduit 53 connects the flow control valve 52 to the load signal conduit 48 downstream of the orifice 50 in a conventional manner. A second fluid motor circuit 54 is connected to the flow control valve by a conduit 55.

A second means 56 is provided for varying the output flow and pressure from the pump 12 to the fluid motor 22 and for controlling the torque of the fluid motor in proportion to a controlled pressurized pilot fluid communicated to the end 30 of the control valve 16. The second means 56 includes a load signal pressure relief valve 58 connected to the load signal conduit 48 downstream of the orifice 50 by a conduit 60 and to the tank 14 by a conduit 62.

A sensing means 64 is provided for sensing the larger pressure signal in the pilot conduits 36, 38 and communicating the larger pressure signal to the load signal pressure relief valve 58. The sensing means 64 includes a resolver valve 66 connected to the pilot conduits 36, 38 and a control conduit 68 connecting the resolver valve 66 to the load signal pressure relief valve 58.

The second means 56 further includes a motor line pressure relief valve 70 connected to the second motor conduit 26 by a conduit 72 and to the first motor conduit 24 by a conduit 74. A signal conduit 76 having an orifice 78 located therein connects the conduit 72 to the motor line pressure relief valve 70 to control the variable pressure setting of the motor line pressure relief valve 70 in conjunction with a spring 80 in a conventional manner. The second means 56 also includes a primary motor line pressure relief valve 82 connected to the signal conduit 76 downstream of the orifice 78 by a control signal conduit 84, 84a and to the tank 14 by a conduit 86. A second control conduit 88 connects the primary motor line pressure relief valve 82 to the control conduit 68.

The second means 56 also includes a second motor line pressure relief valve 90 connected to the first motor conduit 24 by a conduit 92 and to the second motor conduit 26 by a conduit 94. A second signal conduit 96 having an orifice 98 located therein connects the conduit 92 to the second motor line pressure relief valve 90 to control the variable pressure setting of the second motor line pressure relief valve 90 in conjunction with a spring 100 in a conventional manner. A second sensing means 102 for sensing the larger pressure signal is connected to the first and second signal conduits 76, 96 and to the primary motor line pressure relief valve 82, respectively by conduits 104, 84a and 84. The second sensing means includes a resolver valve 106.

A conduit 108, check valves 110 and conduits 112, 114 connect the first and second motor conduits 24, 26 to the tank 14 in a well known manner to provide makeup fluid to the motor conduits as needed.

INDUSTRIAL APPLICABILITY

In the operation of the fluid system 10, the pilot operated control valve 16 is movable between the neutral position and first and second operative positions in response to pressurized pilot fluid being communicated respectively to the first and second ends 30, 32. The pilot valve 34 controllably modulates the pressurized pilot fluid from the pilot pump 40 to the first and second ends 30, 32 to control the movement of the control valve 16 between the neutral and one of the operative positions.

In the first operative position of the control valve 16, pressurized fluid from the pump 12 is communicated to the fluid motor 22 through the first motor conduit 24 and the exhaust flow from the fluid motor 22 is communicated to the tank 14 through the second motor conduit 26. A signal, representative of the load is communicated from the first motor conduit 24 to the pump control 46 through the load sensing port 28 and load signal conduit 48 to control the flow from the pump 12 in a known manner. It is to be recognized that the pump 12 could be a fixed displacement pump and the flow from the pump could be controlled by a bypass valve (not shown) operating in response to the load signal in the load signal conduit 48. Furthermore the flow to the control valve 16 may be controlled by the flow control valve 52 located between the pump 12 and the control valve 16. The flow control valve 52 compares the downstream pressure in the pressure conduit 18 to the load pressure in the load signal conduit 48 and controllably directs excess fluid from the control valve 16 to the motor circuit 54.

The load signal pressure relief valve 58 is movable between a first position at which the load signal is in communication with the tank 14 and a second position, shown, at which the load signal is blocked from the tank 14. The relief valve 58 is infinitely variable and has a plurality of operating pressure levels each being responsive to the instant controlled pressurized pilot fluid communicated thereto from the larger pressure signal in the pilot conduits 36, 38. The relief valve 58 is movable towards the first position in response to pressurized fluid in conduits 48, 60 in a well known manner. The pressurized fluid in control conduit 68 opposes the opening of the relief valve 58. As is well known in the art, the relief valve 58 is of the type that can be adapted to provide a greater effective area for the pressurized fluid from the control conduit 68 to act on than that for the pressurized fluid from conduits, 48, 60 to act on. Preferably, the area difference in this embodiment is 10 to 1 thus allowing a smaller pilot pressure to effectively control the higher load pressure. It is recognized that any desired ratio could be used depending on system requirements.

The controlled pressurized fluid used to move the control valve 16 towards the first operative position is simultaneously communicated to the relief valve 58 to establish the operating pressure level of the relief valve 58. With the motor 22 subjected to a large load that initially resists motion due to its inertia, the pressure in the first motor conduit 24 increases quickly. The load signal being communicated to the pump control 46 causes increased flow from the pump 12 to the motor 22. However, due to the inertia of the load, the fluid motor 22 does not start to turn instantly. In order to maintain a desired torque level on the motor 22 without receiving excess flow, the relief valve 58 will open relieving the load signal in the conduit 48 downstream of the orifice 50. The relief valve 58 opens when the load pressure in conduit 60 reaches a pressure level to overcome the proportional operating pressure level established by the controlled pressurized fluid in the control conduit 68 plus the force of the standard relief valve spring. The flow across orifice 50 in the load signal conduit 48 creates a lower load pressure signal downstream of the orifice 50. The lower load pressure signal acting on the pump control 46 reduces the pump flow to the motor 22. The pump flow to the motor is reduced to substantially zero while maintaining a constant torque by the motor 22 as determined by the operating pressure level of the relief valve 58 until the motor 22 begins to turn. As the motor 22 accelerates, the flow to the motor 22 automatically increases due to the lower load pressure still acting on the pump control 46 which increases pump flow to maintain pressure in the first motor conduit 24. The constant torque is maintained until the motor reaches the desired operating speed as established by the movement of control valve 16. The desired constant torque level applied by the motor 22 is selected by the operator when he actuates the pilot valve 34.

When the motor 22 is operated in the opposite direction by moving the control valve 16 towards the second operative position, the relief valve 58 operates as previously discussed to maintain a constant torque by the motor 22.

The motor line relief valves 70 and 90 are provided to control the maximum pressure level in each of the motor conduits 24, 26. During acceleration of the motor 22 in either direction the relief valves 70, 90 control the maximum pressure level in the motor conduits 24, 26 while during deceleration the relief valves 70, 90 provide a braking force in the respective motor exhaust line.

The primary motor line pressure relief valve 82 controls the operating pressure levels of the motor line relief valve 70, 90 in response to the larger of the controlled pressurized pilot fluid signals communicated to the primary motor line pressure relief valve 82 from the pilot conduits 36, 38.

The construction of the relief valve 82 is the same as the relief valve 58 except the force of the standard spring in the relief valve 82 is greater than the force of the standard spring in the load signal pressure relief valve 58 to ensure that the flow from the pump 12 to the motor 22 is reduced and not passed to tank over the motor line pressure relief valves 70, 90 during acceleration of the motor 22. The first and second signal conduits 76, 96 of the motor line relief valves 70, 90 respectively communicate the motor conduit pressure to the respective motor line relief valve 70, 90 to establish the opening pressure of each relief valve in conjunction with the springs 80, 100. The primary motor line relief valve 82 controls the pressure level in the first and second signal conduits 76, 96 in response to the controlled pressurized fluid in the second control conduit 88 and the force of the standard spring in the primary motor line relief valve 82.

In order to decelerate the motor 22, the operator reduces the controlled pressurized fluid in the pilot conduit 36 or 38 which moves the control valve 16 toward the neutral position. The inertia of the load will cause the motor 22 to continue to turn at the originally established speed thus causing the pressure in the motor exhaust conduit 24 or 26, depending on direction of motor 16 rotation, to increase due to the exhaust opening in the control valve 16 being reduced. For example, consider that motor conduit 26 is the exhaust conduit. The increased pressure communicated through the signal conduit 76 increases the closing force on the motor line relief valve 70. Simultaneously, the increased pressure is communicated to the primary motor line relief valve 82 and biases the primary relief valve 82 towards the open position in opposition to the forces from the controlled pressurized fluid in the control conduit 88 and the standard relief spring to relieve the increased pressure in the signal conduit 76. The portion of exhaust flow being passed to the tank 14 across the motor line relief valve 70 is controlled in proportion to the controlled pressurized pilot fluid in the second control conduit 88.

When there is no controlled pressurized pilot fluid in control conduit 88, the control valve 16 is in the neutral position and the exhaust port in the control valve 16 is blocked. Consequently, all the exhaust flow from the motor conduit 26 must pass across the motor line relief valve 70. The amount of braking force is solely dependent on the spring 80 of the motor line relief valve 70 and the standard spring of the primary motor line relief valve 82. The spring 80 may have a light force or a heavy force depending on the desired amount of normal braking wanted during deceleration of the motor 22 with the control valve 16 in the neutral position shown. To increase the braking force or deceleration torque on the motor 22, the operator would merely apply a controlled pressurized pilot fluid to shift the control valve 16 toward the second operative position. The controlled pressurized pilot fluid simultaneously increases the operating pressure level of the primary motor line relief valve 82 thus adding an additional closing force to the motor line relief valve 70 in proportion to the controlled pressurized pilot fluid in the control conduit 88. During the additional braking force the motor exhaust conduit 26 is in communication with the pressure conduit 18 through the control valve 16. Therefore all of the exhaust flow must return to the tank 14 across the motor line relief valve 70. The load signal in the motor conduit 26 representative of the decelerating load is now communicated to the pump control 46 causing an increase in flow. This is counteracted by the load signal pressure relief valve 58 which as previously explained opens in proportion to the controlled pressurized pilot fluid in the control conduit 68 to lower the load signal. The flow control valve 52 bypasses the excess flow to the other motor circuit 54 in response to the fluid pressure at the control valve 16 acting against the lower load signal in the load signal conduit 48 to move the flow control valve 52 to a bypassing position. It should be noted that alternatively the flow control valve 52 could be deleted without detracting from the scope of the invention.

The second motor line pressure relief valve 90 functions to control the braking torque of the motor 22 identically to the above-described first motor line pressure relief valve 70 when operating the motor 22 in the opposite direction.

In view of the foregoing, it is readily apparent that the structure of the present invention provides an improved fluid system for controlling the fluid motor torque during acceleration and deceleration of the mass being moved by the motor. The system does not require special, complicated valves to control the motor torque while simultaneously controlling the flow to the motor.

Other aspects, objects and advantages of this invention can be obtained from a study of the drawings, the disclosure and the appended claims.

We claim:

1. In a fluid control system (10) having a pump (12), a tank (14) connected to the pump (12), a fluid motor (22), a pilot operated control valve (16) having a neutral and an operative position and a load sensing port (28), the pilot operated control valve (16) being in fluid communication with the pump (12) and the fluid motor (22), first means (44) for varying the output flow and pressure from the pump (12) to the fluid motor (22) in response to a load signal received through the load sensing port (28) with the control valve (16) at the operative position, a source (40) of pressurized pilot fluid and a pilot valve (34) in fluid communication with the source (40) and adapted to controllably communicate the pressurized pilot fluid to an end (30, 32) of the control valve (16) for moving the control valve (16) to the operative position, the improvement comprising:

second means (56) for both varying the output flow and pressure from the pump (12) to the fluid motor (22) and controlling the torque of the fluid motor (22) in proportion to the controlled pressurized pilot fluid communicated to the end (30, 32) of the control valve (16), said second means being operatively connected to said controlled pressurized pilot fluid communicated to the end (30, 32) of the control valve (16).

2. the fluid control system (10), as set forth in claim 1, wherein said second means (56) includes a load signal pressure relief valve (58) in communication with the load signal and the controlled pressurized pilot fluid and being movable between a first position at which the load signal is in communication with the tank (14) and a secnd position at which the load signal is blocked from the tank (14).

3. The fluid control system (10), as set forth in claim 2, wherein said load signal pressure relief valve (58) is infinitely variable and has a plurality of discrete operating pressure levels each level being responsive to the instant controlled pressurized pilot fluid.

4. The fluid control system (10), as set forth in claim 3, including a load signal conduit (48) connecting the load sensing port (28) to the first means (44) and an orifice (50) located in the load signal conduit (48) and being adapted to establish a pressure drop thereacross in response to fluid flow in said load signal conduit (48) to modify said load signal to said first means (44).

5. The fluid control system (10), as set forth in claim 4, wherein said load signal pressure relief valve (58) is connected to said load signal conduit (48) downstream of said orifice (50) to controllably pass fluid from the load signal conduit (48) to the tank (14).

6. The fluid control system (10), as set forth in claim 5, including a pilot conduit (36) connected to the pilot valve (34) and the end (30) of the pilot operated control valve (16), wherein said load signal pressure relief valve (58) is connected to the pilot conduit (36) to establish the operating pressure levels of the load signal pressure relief valve (58) in response to the controlled pressurized pilot fluid.

7. The fluid control system (10), as set forth in claim 6, wherein said pilot operated control valve (16) has a second operating position and a second end (32) and a second pilot conduit (38) connecting the pilot valve (34) to the second end (32) of the pilot operated control valve (16).

8. The fluid control system (10), as set forth in claim 7, including sensing means (64) for sensing the larger pressure in the first (36) and second pilot conduits (36, 38) and communicating the larger pressure signal to the load signal pressure relief valve (58).

9. The fluid control system (10), as set forth in claim 8, wherein said sensing means (64) includes a resolver valve (66) connected to the first and second pilot conduits (36, 38) and a control conduit (68) connecting the resolver valve (66) to the load signal pressure relief valve (58).

10. The fluid control system (10), as set forth in claim 1, including a flow control valve (52) connected between the pump (12) and the pilot operated control valve (16) and being responsive to the load signal to control the fluid from the pump (12) to the fluid motor (22).

11. The fluid control system (10), as set forth in claim 10, wherein said flow control valve (52) is a priority flow control valve and including a second fluid motor circuit (54) connected to the priority flow control valve (52) to receive fluid bypassed from the fluid motor (22).

12. The fluid control system (10), as set forth in claim 1, wherein said pilot operated control valve (16) has a second operative position and a second end (32); first and second pilot conduits (36, 38) respectively connect said first and second ends (30, 32) of said pilot operated control valve (16) to said pilot valve (34); first and second motor conduits (24, 26) connect the pilot operated control valve (16) to the fluid motor (22); at the first operative position of the pilot operated control valve (16), the first motor conduit (24) communicates pressurized fluid from the pump (12) to the fluid motor (22) and the second motor conduit (26) communicates the exhaust fluid to the tank (14); wherein said second means (56) includes a motor line pressure relief valve (70) connected to the second motor conduit (26) and movable between a first fluid blocking position and a second fluid conducting position in response to a fluid pressure signal from the second motor conduit (26); said second means (56) further includes a primary motor line pressure relief valve (82) in fluid communication with the fluid pressure signal from the second motor conduit (26) and the controlled pressurized pilot fluid and being movable between a first fluid blocking position and a second fluid conducting position in response to the controlled pressurized pilot fluid.

13. The fluid control system (10), as set forth in claim 12, including a signal conduit (76) connecting the second motor conduit (26) to the motor line pressure relief valve (70) and an orifice (78) located in the signal conduit (76) and being adapted to establish a pressure drop thereacross in response to fluid flow in said signal conduit (76) to reduce the fluid pressure downstream of the orifice (78).

14. The fluid control system (10), as set forth in claim 13, including a control signal conduit (84, 84a) connected to the signal conduit (76) downstream of the orifice (78) and to the primary motor line pressure relief valve (82).

15. The fluid control system (10), as set forth in claim 13, wherein the second means (56) includes sensing means (64) for sensing the larger pressure in the first and second pilot conduits (36, 38) and communicating the larger pressure signal to the primary motor line pressure relief valve (82).

16. The fluid control system (10), as set forth in claim 15, wherein said sensing means (64) includes a resolver valve (66) connected to the first and second pilot conduits (36, 38) and a second control conduit (68, 88) communicating the larger pressure signal to the primary motor line pressure relief valve (82).

17. The fluid control system (10), as set forth in claim 16, including a second motor line pressure relief valve (90) connected to the first motor conduit (24) and movable between a first fluid blocking position and a second fluid conducting position in response to a fluid pressure signal in the first motor conduit (24) and a second signal conduit (96) having an orifice (98) located therein connecting the fluid pressure signal from the first motor conduit (24) to the second motor line pressure relief valve (90).

18. The fluid control system (10), as set forth in claim 17, including another sensing means (102) for sensing the larger pressure signal in the first and second signal conduits (76, 96) and communicating the larger signal to the primary motor line pressure relief valve (82).

19. The fluid control system (10), as set forth in claim 1, wherein the second means (56) for varying includes a load signal pressure relief means (58) for controlling the starting torque of the fluid motor (22) and for varying the output flow and pressure from the pump (12) during acceleration of the fluid motor (22), and a motor line pressure relief means (80, 82, 90) for controlling the stopping torque of the fluid motor (22) during deceleration of the fluid motor (22) each in proportion to the controlled pressurized pilot fluid communicated to the end (30) of the pilot operated control valve (16).

20. The fluid control system (10), as set forth in claim 19, wherein said load signal pressure relief means (58) opens at a pressure less than that required for the motor line pressure relief means (80, 82, 90).

* * * * *